Aug. 31, 1965 G. BARTZ 3,203,656
DIAL TEST INDICATOR HOLDER
Filed July 31, 1963 2 Sheets-Sheet 1
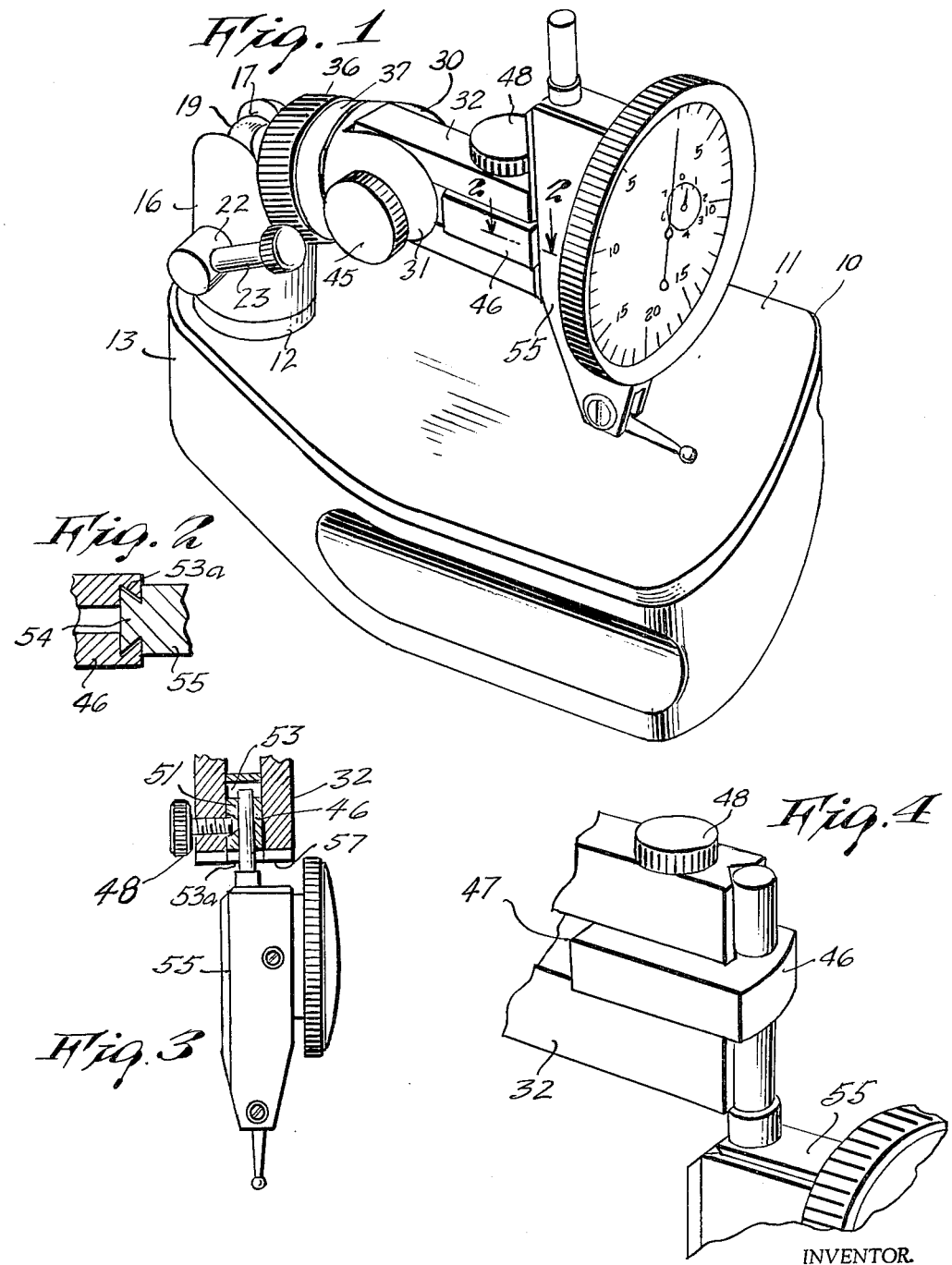
INVENTOR.
GUNTER BARTZ

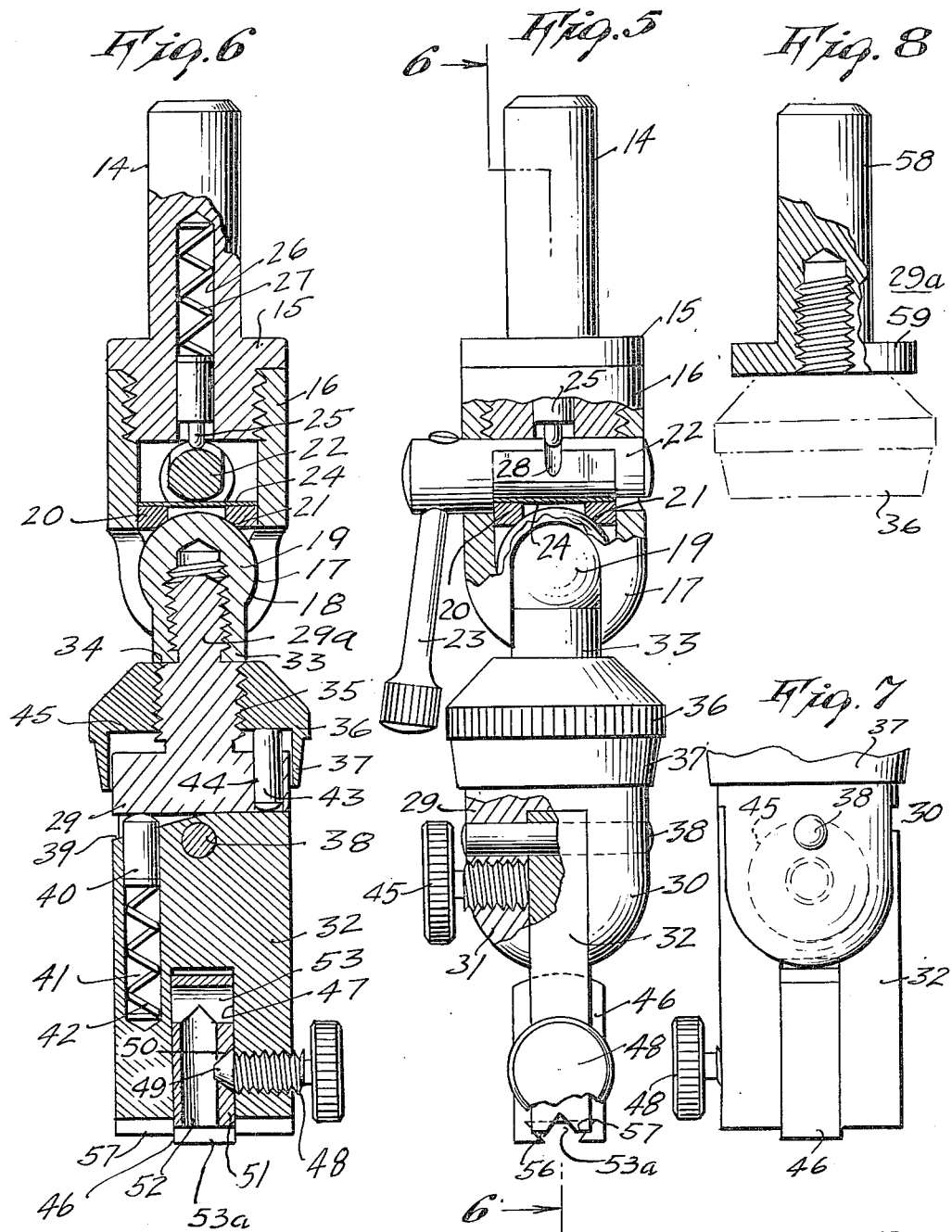

United States Patent Office 3,203,656
Patented Aug. 31, 1965

3,203,656
DIAL TEST INDICATOR HOLDER
Gunter Bartz, 108—50 71st Ave., Forest Hills 75, N.Y.
Filed July 31, 1963, Ser. No. 298,866
12 Claims. (Cl. 248—124)

This invention relates to dial test indicator holders, with the general purpose of this invention to provide an improved holder of this type, which will be more efficient, and provide more functions than previously known indicator holders.

Dial test indicators are used particularly in machine shops for testing and ascertaining alignment, size, surface, deflections and other variations in the dimension of stock or material to be used in machining. The dial test indicator is a very sensitive and delicate instrument which includes a feeler for sensing needle adapted to be held in contact with the work being tested, and a gage with a rotating indicator pointer responsive to the sensing action of the feeler, to indicate the surface condition of the work being tested. The indicator is capable of sensing and indicating exceedingly slight variations of the work material from standard variations which may be measured in thousandths of an inch. It is obvious that such an instrument must be delicately handled to avoid damage to it, and also to permit it to record accurate readings. Accordingly, the indicator must be held firmly and in a steady position relative to the work, to avoid false deflections of the dial pointer. Its initial setting relative to the work must be made gently, in order to avoid any forceful or sharp engagement with the feeler of the work. A forceful or sharp engagement may result in damage to the indicator and subsequent inaccurate readings. A further requirement is that the initial setting of the indicator should be effected efficiently and quickly, albeit delicately, so that valuable work time is not wasted.

It is also pertinent that an indicator holder should be capable of deploying the indicator feeler in a large variety of positions, so that work of all various types and locations can be tested quickly and accurately, and therefore, it is important that a holder be adapted to be installed to various important locations.

Previously known indicator holders do not have the versatility that is needed to accomplish the above described requirements.

Accordingly, a main object of this invention is to provide a dial test indicator holder which enables universal adjustment of the indicator relative to the work, and wherein the indicator can be adjusted rapidly, gently, and held in a firm and steady position relative to the work during the testing. Another important object of the invention is to provide a dial test indicator holder which is compact, economical to manufacture, and efficient in its operation for the purposes intended.

A still further important objective of this invention is to provide an indicator holder which is adapted for being mounted on an independent test stand, used as a universal surface gage, or a versatile indicator attachment adapted for mounting on conventional machine tools.

It is still a further object that the indicator holder be adapted to receive a dial indicator in a plurality of positions, whereby the indicator feeler can be more appropriately versatilely mounted for various testing or sensing operations.

A still further object of this invention is to provide an indicator holder comprising improved components resulting in a more efficient and universal means for steadily and gently holding and deploying an indicator for sensing and testing work.

The foregoing and other objects and advantages of this invention will appear more fully hereinafter, in the detailed description which follows, taken together with the accompanying drawings wherein embodiments of the invention are illustrated.

It is to be expressly understood however, that the drawings are for the purpose of illustration and description, and they are not to be construed as defining the limits of the invention.

Referring to the drawings, it is seen that:

FIGURE 1 is a perspective view of the invention showing the indicator holder mounted on a test stand with a dial indicator mounted on the holder in operative position ready for testing or sensing operation.

FIGURE 2 is a horizontal cross-section through plane 2—2 of FIGURE 1, showing a dove-tail sliding method for retaining the indicator on the holder.

FIGURE 3 is a fragmentary side view partially in cross-section showing an alternate manner of retaining the indicator on the holder.

FIGURE 4 is a fragmentary perspective view showing still another method for retaining the indicator on the holder.

FIGURE 5 is a side elevation of the invention partially cross-section, to show various details of the invention.

FIGURE 6 is a longitudinal cross-section through plane 6—6 of FIGURE 5.

FIGURE 7 is a fragmentary end elevation showing details of the co-action between the indicator and the holding means.

FIGURE 8 is a side elevation of a modified form of the indicator holder partly shown in cross-section.

Referring now to the drawings, and in particular, FIGURE 1, the indicator holder is seen to comprise a test stand 10 having a planar surface 11 adapted to receive the work, and a longitudinal bore 12 located along the axis of the stand adjacent the narrow end 13. Bore 12 is adapted to receive snugly the shank 14 of the holder base 15. The holder base 15 is secured within the bore 12 by means of a set-screw (not shown), mounted in the stand 10, at right angles to, and adapted for, contact with the shank 14. The holder base 15 includes a ball socket housing 16 which is threaded to the said base, and whereby the said housing 16 forms a hollow extension of the holder. At the outer end of the housing 16, there is provided a channel 17 in which is formed a ball socket 18 adapted to receive a ball 19, for the purpose of providing a universal joint between the base and the means for holding the indicator.

Mounted within the hollow housing 16 is a cam lever assembly adapted to retain the ball 19 in any desired relative position within the socket 18. The cam lever assembly comprises a centrally perforated washer 20 having a spherical seat surface 21 concentrically disposed about the perforation and adapted to receive and seat the surface of ball 19. A cam 22 is mounted transversely through the housing 16, and is provided with an actuating lever 23 for rotating the said cam about an axis transversely to a longitudinal axis of the holder. A spring washer 24, slightly bowed towards the cam, is mounted in abutment with the washer 20, and the bowed portion of the said spring washer being in contact with the cam, whereby pressure is transmitted from the cam through the spring washer to the ball and ball socket surfaces.

In the position shown in FIGURE 6, a minimum of pressure is provided by cam 22, but the minimum pressure being sufficient to generally retain the ball in any relative position that it happens to be. When however, it is desired to increase this frictional engagement between the ball 19 and the seat 21, the cam lever 23 is rotated clockwise or counter-clockwise, so that greater pressure is transmitted by the cam to the ball seat, whereby the ball will be held firmly for a testing or sensing operation. When the cam lever is returned to the position shown in FIGURE 6, the ball can be easily and gently rotated to any desired position, and then again locked in place. Although the ball will not displace readily under its own weight when in a position shown in FIGURE 6, it may be conveniently and easily moved by hand to any desired location, and then locked in position by movement of lever 23. The cam 22 is centered into position by means of a pin 25, which is resiliently mounted in a bore 26 and biased into contact with the cam 22 by means of a spring 27 retained within the said bore 26. Cam 22 is provided with a peripheral groove 28 adapted to receive the pin 25 for guiding and centering purposes, whereby the cam 22 will be properly retained within the housing 26 and resiliently urged toward the spring washer 24 at all times. The ball 19 is mounted in a ball socket 18 through the inner end of housing 16 when holder 15 has been removed from housing 16. The washer 20, spring washer 24, and cam 22, are then placed in a position, and then the cam lever assembly is locked into place by threading holder 15 into its operative position within housing 16, with pin 25 resiliently received in groove 28.

The outer portion of the indicator holder assembly comprises a sub-assembly for retaining the dial indicator, and for making fine adjustments in the location of the feeler after the indicator has been generally locked by means of the ball universal joint. Said sub-assembly comprises a thimble 29 threaded at its inner end 29a for removable connection with the internally threaded ball 19. Said thimble includes spaced bifurcations 30 and 31 at its outer end adapted to receive indicator holder 32 therebetween. The ball 19 has an outer cylindrical extension 33, which terminates in a flat transverse surface adapted to abut a coacting surface 34 on the thimble. The thimble 29 further includes a larger threaded portion 35 on which is mounted an internally threaded control shell 36. When the thimble 29 has been appropriately mounted within ball 19, transverse surface 34 will be in contact with the outer end of the cylindrical extension 33 of the ball. Control shell 36 will be at the same time, mounted on the threaded portion 35 of the thimble, and when in the position as shown in FIGURE 6, will also be in abutment with the cylindrical extension 33 of the ball. Further outward reciprocation of the shell 36 on the threaded portion 35 of the thimble, results in actuation of indicator holder 32, as will be described herein-below. It should be noted that shell 36 includes a skirt 37 which surrounds thimble 29, thereby protecting it and preventing injurious wear and tear on its internal components. Holder 32 is pivotally mounted within the bifurcations 30 and 31 by means of a pivot pin 38 which extends transversely through the bifurcations, and is spaced from the cylindrical portion of thimble 39. Holder 32 is generally rectangular in shape, excepting, for the tapered surface 39 which is shown in FIGURE 6, extending approximately from the axial center of the device outwardly to the left, providing thereby a triangular clearance between the thimble and the holder, whereby the holder can be rotated to a limited extent in a clockwise direction, as seen in FIGURE 6. Resisting such rotation is a spring-pressed return pin 40 mounted in a bore 41, and which is acted upon by a spring 42 within said bore. Rotation of holder 32 about pin 38, is accomplished by the action of control pin 43 disposed in a bore 44 in the thimble, and extending therethrough to engage the shoulder 45 of the control shell 36 (refer to FIGURE 6). Accordingly then, the position of holder 32 can be rotated with fine adjustment by means of the control shell 36 which is reciprocated along the threads 35 to cause longitudinal reciprocation of control pin 43, which in turn, rotates holder 32 about pivot pin 38 between the bifurcations 30 and 31. Rotation or movement of holder 32 is constantly resiliently resisted by pin 40, which tends to return the holder to the axially aligned position of FIGURE 36. When holder 32 has been rotated to a desired angular position from the longitudinal axis of the thimble 29, it is then locked into place by means of locking screw 45 which is mounted through bifurcation 31, and is adapted to engage holder 32 for retaining purposes. Release of locking screw 45a will permit holder 32 to be returned to the zero or axial position of FIGURE 6, due to the action of spring pressed pin 40, and rotation of control shell 36.

Holder 32 is adapted to retain the indicator by means of a swivel mount 46 which is snugly fitted within a channel 47 formed at the outer end of holder 32. Channel 47 extends parallel to pivot pin 38. Swivel mount 46 is mounted for rotation within channel 47 by means of a pivot screw 48 which has a tapered head 49 adapted to be received in a correspondingly tapered bore 50 formed through a side wall 51 of the swivel mount 46. A longitudinal bore 52 is formed through the outer end of swivel mount 46 in an off-center position with respect to its width. This can be seen especially in FIGURE 6 where it is clearly shown that side wall 51 is thicker than the opposite side of the swivel mount. The purpose of this off-center bore 52 is to provide sufficient thickness to accommodate the tapered bore 50 which is used to seat the tapered head 49 of the pivot screw 48. By means of the pivot screw 48, swivel mount 46 can be rotated to various positions about 48 as an axis, and then locked securely in place by driving home tapered head 49 to contact tapered bore 50. In addition, swivel mount 46 also includes a transverse bore 53 at the inner end of bore 52. Bores 52 and 53 function to receive the mounting pin (not shown) of the dial indicator, whereby said dial indicator can be mounted relative to the holder 32 at positions spaced 90° apart, inasmuch as bores 52 and 53 are disposed at right angles to each other. In addition to the two above methods of mounting the dial indicator within swivel mount 46, there is a third position which is accomplished by means of the tapered slot 53a formed at the outer end of the swivel mount 46. Said tapered slot diverges inwardly and is adapted to co-act with a correspondingly tapered tongue 54 on the dial indicator 55 seen in a cross-sectional view of FIGURE 2.

Thus, tongue 54 of the dial indicator 55, and tapered slot 53a form a dove-tail slidingly adjustable mounting for the dial indicator on the swivel mount 46. Holder 32 is provided with a pair of parallel flat surfaces 56 and 57 which are used as an aid in aligning the tongue 54 of the indicator 55 with the slot 53a. It is to be noted that surfaces 56 and 57 are not aligned with the bottom of slot 53a in order to act as a guide for the tapered tongue 54 and indicator 55 when mounting the indicator within the slot 53a.

It is further to be noted that pivot screw 48, in addition to locking swivel mount 46 in place, is also adapted to inject into the bore 52, and thereby engage the mounting pin of the indicator retaining the said mounting pin therein. Consequently, tapered screw 48 performs a dual function of locking the swivel mount and the indicator together. When the swivel mount is locked in the positions shown on FIGURES 5 and 6, which is in readiness to receive tongue 54, dial indicator 55 for the dove-tail sliding position is well to note that when pivot screw 48 is in locked position, it will substantially prevent any sliding motion of the indicator within slot 53a, because of the tight clearances between surfaces 56, 57, and the tapered sides of slot 53a. When pivot screw 48 is released, permitting rotary motion of the swivel mount about the axis of screw 48, the clearances between slot 53a and surfaces 56 and 57, are increased, permitting more readily sliding motion of the indicator, so that it can be removed from the swivel mount.

In FIGURE 8, a modification is shown whereby the over-all length of the holder can be substantially reduced from the embodiment shown in FIGURES 5 and 6. This is done by substituting an internally threaded pin 58 for the entire assembly extending from the ball 19 on through holder 15 and tongue 14. Pin 58 then is adapted for retention in the chuck of a machine tool or any other base adapted to receive pin 58. Of course pin 58 will not have the universal action provided by ball 19 and socket 18, and its accompanying adjusting cam lever, for it will be much reduced in its over-all length in permitting it to be used for certain special sensing operations which require a holder of small dimension, and where the versatile adjustment possible with the ball 19, is not needed. It will of course still possess the small and fine adjustment provided by holder 32, thimble 29, with its control shell 36, as described hereinabove.

Thus, to use the embodiment or modification as shown in FIGURE 8, this engages ball 19 from the thimble threads 29a, and replaces the entire assembly by pin 58 which is then threaded on to the thimble threads 29a, and wherein collar 59 will be in abutment with control shell 36 shown in phantom in FIGURE 8.

It is now apparent that the embodiment of my invention, as described hereinabove, will provide an extremely adjustable and firm holder for a sensitive dial indicator. The universal action provided by the ball arrangement will permit the outer holder sub-assembly to be deployed to a great variety of positions, and then the final accurate adjustment is made by means of the control shell 36, and the fine angular displacement of the holder 32, as herein described. Further adjustment in a direction at right angles to the movement of holder 32 about its axis 38, is accomplished by means of the swivel mount 46 which rotates along an axis at right angles to the axis of pin 38. Thus, an infinite variety of positions can be obtained with this invention, and which positions can be firmly maintained to provide accurate sensing or testing means to accuracies up to one ten-thousandths of an inch.

It is further important to note that in addition to providing and maintaining these various adjustable positions, my holder is adapted to receive an indicator in three different positions by the provision of a single novel swivel mount as above described, providing an even further versatile arrangement.

When used with an independent test stand such as 10, very accurate readings can be taken, since the surface 11 is accurately planar, whereby movement of the work on test stand 10 is assured to be precisely planar, thereby not introducing significant or pertinent inaccuracies due to the surface upon which the work rests. Although use of the indicator holder, and the indicator in conjunction with a test stand such as 10, is an extremely important feature of this invention, it should be noted that by means of pin 58, as shown in FIGURE 8, or shank 14 of FIGURES 5 and 6, the indicator can be mounted in appropriate machine components for testing and sensing locations not requiring a test stand such as 10, thus assuring universal utility for this indicator holder. The control shell 36 provides a final indicator position with a mere twist of the fingers, and in fact, is a micro-control allowing the user a finer position of the indicator within a millionth of an inch.

When used at the machine, this improved indicator holder permits a set-up close to the chuck with a minimum of over-hang, and allows a wide radius off-set indication up to three inches.

There are many more advantages that accrue from this improved construction, and the foregoing description points out the most pertinent features of this invention, and its improvement over previous devices of this type, and is not meant to restrict either the advantages or specific embodiments of this invention.

Various changes can be made in the design and arrangement of the parts without departing from the spirit and scope of the invention, and it is my intent therefore, to claim this invention as shown and described, and also in such forms and modifications as may be reasonably construed to fall within the inventive scope of the following appended claims.

I claim as follows:

1. An adjustable device for holding a dial indicator in a variety of positions comprising a base adapted to be mounted on a rigid platform, and a holder sub-assembly removably attached to the base, and having an outer end adapted for removable connection with a dial indicator, said base comprising a cylindrical shank, and an outer member having internal threads for axially threaded connection to the holder sub-assembly, said holder sub-assembly including an externally threaded member at its inner end threadedly received in the internally threaded member of the base, said holder sub-assembly further comprising a holder pivotally mounted on a thimble, said thimble being an integral extension of the externally threaded member, in further combination with a control shell means threadedly mounted on the said thimble, whereby said shell means can be reciprocated longitudinally with respect to the axis of the thimble, and relative to said pivoted holder, further including spring pressed means disposed between and in contact with the inner end of the holder, and the said thimble, said means being eccentric to the axis about which the holder can pivot, whereby reciprocation of the control shell means towards the holder, will cause pressure on said means, thereby causing rotation of the holder about its pivotal axis, said control shell means encompassing said thimble, said holder further including means for retaining a dial indicator at its outer end, said means being rotatable about an axis at right angles, to the axis about which the holder pivots, said holder and the last said means both being retainable at various positions of rotation with respect to their axes.

2. A device as in claim 1, wherein said base includes a socket for receiving a ball, and wherein said holder sub-assembly includes a ball adapted for removable connection within said socket to provide a universal joint including means mounted on said base for retaining the ball at any desired position of rotation relative to said socket.

3. A device as in claim 1, wherein said base has a socket with internal threads for receiving the externally threaded member provided on the holder sub-assembly.

4. A device as in claim 2, wherein said base includes a spherical seat relatively rotatable with respect to said ball, and wherein there are means provided for applying pressure to force said seat against said ball, whereby said ball can be retained at any desired position of rotation with respect to said socket and said seat.

5. A device as in claim 4, including a cam rotatably mounted within said base for transmitting varying degrees of axial pressure against said seat, and means for rotating the said cam to vary the pressure applied by the cam.

6. A device as in claim 5, including a resilient washer in abutment with the said seat, and in resilient contact with the said cam at all positions of the cam, whereby rotation of the said cam varies the pressure resiliently against the seat via the said washer, thereby applying variable resilient pressure between the ball and the seat.

7. A device as in claim 6, wherein said thimble is threadedly connected to the said ball, and wherein said ball has a cylindrical extension extending through the control shell, and wherein said control shell has an outer skirt fully encompassing said thimble, obscuring it from external view, and protecting the internal components therein, of the device.

8. A device as in claim 7, wherein the means for retaining the dial indicator fixedly within the holder, comprises a swivel mount having a plurality of bores at right angles to each other for receiving the indicator spindle and a perforation, a pin mounted through the holder and extending into the perforation to provide a pivot for the said swivel mount.

9. A device as in claim 8, wherein said perforation is tapered and said pin has a tapered head for contact with the tapered sides of the perforation, whereby, when the said tapered head is fully seated in the perforation, the swivel mount can be prevented from rotating and can be fixed for any desired angle with the rotation of the pin.

10. A device as in claim 9, wherein one of said bores communicates with said tapered perforation, whereby seating of the tapered head of the pin in the said perforation will also cause said pin to contact the spindle of the dial indicator, thereby simultaneously affixing the indicator within said bore.

11. A device as in claim 10, wherein one end of said swivel mount includes a tapered slot for receiving a correspondingly tapered tongue on the dial indicator, whereby the dial indicator can be adjustably mounted within the said slot, and means for securing the indicator tongue at any desired location within the said slot.

12. A device as in claim 4, wherein said base includes a pin reciprocally mounted internally of the base along its axis, with resilient means biasing said pin outwardly of the base, and including a cam lever mounted at right angles to the axis of the base wherein said lever includes an external groove at right angles to the axis of the base, and said pin is resiliently pressed into said groove to function as a guiding and retaining means for the cam lever in said socket.

References Cited by the Examiner
UNITED STATES PATENTS

| | | | |
|---|---|---|---|
| 2,073,089 | 3/37 | Autenrieth | 33—172 X |
| 2,506,924 | 5/50 | Huber | 248—124 X |
| 2,632,660 | 3/53 | Krauthamer | 248—279 X |
| 2,861,501 | 11/58 | Strelakos | 248—279 X |

FRANK L. ABBOTT, *Primary Examiner.*

CLAUDE A. LE ROY, *Examiner.*